(12) United States Patent
Dillenberger et al.

(10) Patent No.: US 7,689,996 B2
(45) Date of Patent: Mar. 30, 2010

(54) METHOD TO DISTRIBUTE PROGRAMS USING REMOTE JAVA OBJECTS

(75) Inventors: Donna N. Dillenberger, Yorktown Heights, NY (US); Mark Francis Hulber, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 10/773,726

(22) Filed: Feb. 6, 2004

(65) Prior Publication Data

US 2004/0163085 A1    Aug. 19, 2004

Related U.S. Application Data

(62) Division of application No. 09/374,540, filed on Aug. 16, 1999, now Pat. No. 6,732,139.

(51) Int. Cl.
*G06F 9/46* (2006.01)

(52) U.S. Cl. ....................... 718/104
(58) Field of Classification Search ........... 718/104
See application file for complete search history.

(56) References Cited

U.S. PATENT DOCUMENTS

| | | | |
|---|---|---|---|
| 4,318,173 A | | 3/1982 | Freedman et al. |
| 4,980,824 A | * | 12/1990 | Tulpule et al. ............. 718/106 |
| 5,381,534 A | * | 1/1995 | Shi ............................ 709/203 |
| 5,442,791 A | | 8/1995 | Wrabetz et al. |
| 5,504,894 A | | 4/1996 | Ferguson et al. |
| 5,581,691 A | | 12/1996 | Hsu et al. |
| 5,835,698 A | | 11/1998 | Harris et al. |

(Continued)

FOREIGN PATENT DOCUMENTS

DE    1 398 651    6/1975

(Continued)

*Primary Examiner*—Meng-Ai An
*Assistant Examiner*—Mengyao Zhe
(74) *Attorney, Agent, or Firm*—Scully, Scott, Murphy & Presser, P.C.; Daniel P. Morris, Esq.

(57) ABSTRACT

A distributed Java virtual machine method and system for managing distributed heterogeneous network nodes to timely and efficiently meet demand for service requests. Upon receipt of a request for service, Java workload manager (JWLM) of the present invention classifies the request into a particular type of service, places the work on a logical queue to be executed. Routing queues place the work on one of many available nodes. The work is distributed to the nodes based on accounting, availability and past performance of all nodes considered. Changes are made periodically to the system to meet demands for service and/or conserve resources. JWLM of the present invention learns the needs of programs over time and does not require the intervention of a system administrator. The system does not rely on system specific metrics. JWLM may use performance metrics. Additionally, the present invention allows objects to be distributed and run on distributed workstations by distributing work through the cluster of workstations, while behaving as if it were initiated locally on the machine on which it runs. The similar type of work sent to different workstations may have the same class names, and the classpath may hold different implementations of that object at a particular workstation. Thus, at dynamic compilation time, if a platform has a more efficient feature than others, a work unit is dynamically compiled with the more efficient feature.

2 Claims, 2 Drawing Sheets

U.S. PATENT DOCUMENTS

| | | | |
|---|---|---|---|
| 5,892,945 A | 4/1999 | Mirchandaney et al. | |
| 5,991,808 A * | 11/1999 | Broder et al. | 709/226 |
| 6,006,255 A | 12/1999 | Hoover et al. | |
| 6,166,729 A * | 12/2000 | Acosta et al. | 715/719 |
| 6,230,183 B1 | 5/2001 | Yocom et al. | |
| 6,279,001 B1 * | 8/2001 | DeBettencourt et al. | 707/10 |
| 6,360,256 B1 | 3/2002 | Lim | |
| 6,430,538 B1 * | 8/2002 | Bacon et al. | 705/9 |
| 6,434,594 B1 | 8/2002 | Wesemann | |
| 2001/0039549 A1 * | 11/2001 | Eng et al. | 707/205 |

FOREIGN PATENT DOCUMENTS

| | | |
|---|---|---|
| EP | 0 942 363 A1 | 9/1999 |
| WO | WO 98/15903 | 4/1998 |
| WO | WO 00/10084 | 2/2000 |

* cited by examiner

METHOD TO DISTRIBUTE PROGRAMS USING REMOTE JAVA OBJECTS

RELATED APPLICATIONS

This application is a divisional of U.S. application Ser. No. 09/374,540, filed Aug. 16, 1999, now U.S. Pat. No. 6,732,139.

TECHNICAL FIELD OF THE INVENTION

The present invention relates in general to computer systems and particularly, to a system for managing an execution of computer programs and a corresponding interface to the system. Further, it relates to a method of implementing the system and associated interfaces.

BACKGROUND OF THE INVENTION

Distributed processing relates to performing computer processing tasks-over multiple computer systems. In distributed processing, each system performs a part of the task to process. Conventional workload management systems favor the distribution of large programs separately among a cooperating group of network nodes. These methods work to optimize the performance of each single application without regard to performance of other programs presently in the system. Additionally, these systems generally require an intervention by a system administrator, user input or advance knowledge of program behavior and/or resource needs, uniform system metrics and/or a homogeneous platform. Thus, it is highly desirable to have a workload management system which avoids all the foregoing requirements. Further, it is highly desirable to have a flexible and adaptable system for sharing heterogeneous network resources to execute computer programs in a timely manner as if they were run alone on a single workstation.

The existing distributed processing methods to cluster workstations rely on hardware or operating system specific tuning information such as number of swapped users, user queue length, and paging sets. Thus, it is also highly desirable to have a distributed processing system which is capable of dynamically generating statistics relating to performance of various platforms and operating systems in an agnostic fashion. At the same time, it is also highly desirable to have additional platforms and workstations that dynamically participate in the cluster.

As a network of workstations grows, it is important to be able to take an advantage of unutilized central processing unit (CPU) resources anywhere in the network. Java, for example, helps code portability by running code in its own Java virtual machine (JVM) that hides the details of the platform from the application program. However, when portable codes are employed, more efficient services which are available on specific systems and platforms often cannot be utilized and thus performance typically becomes degraded when using such codes. For instance, a code such as Java developed to run anywhere may not be able take advantage of unique hardware and/or software features of a specific platform. Therefore, it is highly desirable to have a method and system for enabling an object running in a Java Virtual Machine to uniquely identify its location while remaining similar to other distributed versions of the same object in name and type. It is also desirable to have a work unit take advantage of platform features while remaining truly system agnostic.

Further yet, other existing methods require a systems programmer to update a configuration file which the distribution software reads to learn about which workstation has which special hardware/software features. Moreover, these existing methods require different versions of the same application, for example, one version that runs on operating system A, another version that runs with version B, another version that checks if hardware C is available. Thus, it is highly desirable to have a method and system enabled to perform distributed processing without the need to have special configuration information related to a particular workstation. It is also highly desirable to have such a method and system take advantage of the special configuration information if available. Moreover, it is also highly desirable to have such a method and system run the same copy of an application on any platform/version/operating system.

SUMMARY OF THE INVENTION

The present invention is directed to a flexible and adaptable system for sharing heterogeneous network resources to execute computer programs in an efficient and timely manner as if the programs were run alone on a single workstation. The method and system of the present invention is capable of distributing any Java workload. The present invention provides a Java Workload Manager (JWLM), a model for managing distributed heterogeneous network nodes to meet demands for service requests in a timely and efficient manner. Upon receiving a request for service and places, JWLM classifies the request into a particular type of service, places the work on a logical queue to be executed. Routing queues place the work on one of many available nodes in the network ready to process this type of service. The choice of which node to place the work is based on accounting, availability and past performance of all nodes in question. Periodically, changes are made to the system in order to meet demands for service and/or conserve resources.

The JWLM of the present invention is enabled to learn the needs of programs over time, thereby eliminating a need for intervention by a system administrator. Moreover, the method and system of the present invention need not rely on system specific metrics, although the performance metrics may be used in an alternate embodiment.

The present invention also allows objects to be distributed and run on distributed workstations while behaving as if they were initiated locally on the machine on which they run. Objects are typically small pieces of program code that perform some very specific task. For example, a complex application can be built by combining objects. Each object is a stand-alone piece of code that can be combined with other objects by employing one or more interfaces to the object for communicating. Objects may be distributed to different computers and communicate with one another over the network using one or more interfaces to the objects. The work in the present invention is distributed through the cluster of workstations. The work sent to different workstations all have the same class name. At a particular workstation, the class path may hold different implementations of that object. Thus, at dynamic compilation time, if a platform has a more efficient threading package or is capable of taking advantage of a more efficient storage hardware device, the work unit is dynamically compiled with the more efficient feature.

In the present invention, the work unit has the same class name in all the nodes, although their class path implementation may be different. Further, the workload manager software need not know of a special feature a particular workstation may include. The implementation advantages of a workstation are bound to the work unit at dynamic compilation time, allowing for transparency of a distributed system of workstations.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

The following terms are used to describe the present invention herein. Definitions of the terms as defined hereinbelow generally correspond to those used in the industry:

cluster—a collection of computers cooperating as a unit to participate in one or more tasks;

distribute—sharing of the execution of computer programs among nodes in a system;

dynamic—the ability to complete a task during the run-time of a system or application;

heterogeneous—a collection of computers sharing a similar hardware and software configuration;

homogeneous—a collection of computers which differ in either hardware or software configuration;

node—a computer or processor capable of executing programs and communicating on a network;

resource—a computer or device capable of contributing to the completion of the execution of a computer program;

thread—a component of a computer program capable or being scheduled to run on a processor independently;

workload—a measure of the number of programs ready for execution;

workstation—a computer capable of executing programs and communicating on a network;

work unit—logical entities that represent a client request.

Figure 1:
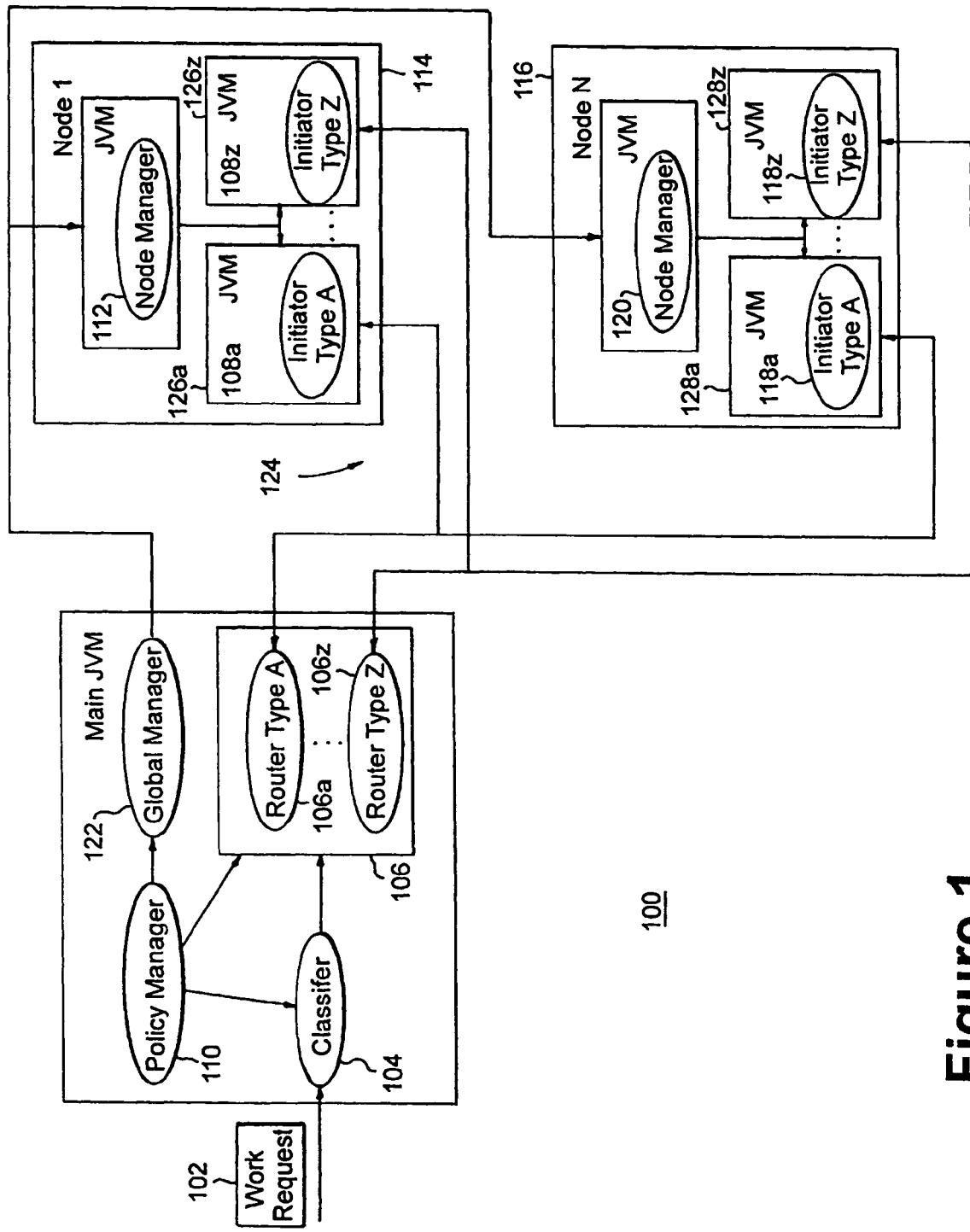
FIG. 1 is an example of a diagram illustrating the components of JWLM of the present invention.

In one embodiment of the present invention, the Java Workload Manager (JWLM) is divided into two logical functional components: management components and execution components. These two logical functional components cooperate to service requests seamlessly in a distributed environment. Each component and its subcomponents will be described hereinbelow with reference to FIG. 1. FIG. 1 is a diagram 100 illustrating the components of the JWLM according to one embodiment of the present invention. In FIG. 1, various modules of the system of the present invention are shown as well as the flow of information among the various modules. It should be understood that object oriented platforms other than JVM may be employed to implement the present invention.

Management Components

As shown in FIG. 1, a work request 102 originates from the outside and is sent to a classifier 104. The classifier 104 sends this work request 102 to an appropriate router 106 which then hands the work request 102 to an available initiator 108a, . . . or, 108z located at a particular node, e.g., node 114, 116. When finished, the initiator 108a, . . . or, 108z sends the manageable object and statistics back to the router for post processing. The policy manager 110 queries the router modules 106a, . . . , 106z for statistics and passes instructions to the node managers 112, 120 at respective nodes 114, 116 when appropriate. One such remedial step may include the policy manager 110 starting an additional initiator at an available node 114, 116. Alternatively, the policy manager 110 may add additional router capacity.

Classifier

In one embodiment of the present invention, the classifier 104 is responsible for receiving work requests for service and assigning the task to the router 106a, . . . , 106z appropriate for this type of work. The classifier 104 keeps a list of available routers. If more than one router is available for the same type of work, the classifier selects one based on the routing policy in effect. An example of a routing policy include a router 106a . . . 106z scheduling work at initiators 108, 118 on a first come first served basis. Another example may include dispatching work at initiators 108, 118 in a manner such that the most responsive initiators are given priority in receiving work from a router 106. To track its own performance, the classifier 104 may monitor the size of its incoming queue and avoid becoming the system bottleneck. The policy manager 110 also may monitor the classifier 104 as well as the other components and make changes which may include an increased level of multithreading of the classifier 104.

Prior to instantiation of the classifier 104 the policy manager 110 reads all the classification specifications from a configuration file. The nature of the information in the configuration file includes the type of work, associated Java class name, router name and node specifications. This information may also be generated dynamically at run time.

The classifier 104 generally enables similar types of work to be serviced separately to ensure service levels among this the type of work. The interface to the classifier 104 includes the following functions and allow new work to be associated with existing workloads in a distributed system.

newWork( )—creates a manageable object for a new piece of work and puts it on the appropriate workload queue, that is a router.

subWork( )—some requests for service may be split into several smaller semi-independent services. For instance, a request for a web page may include several requests for other individual pages. These requests share the same work unit. This interface is called by an initiator 108a, . . . , 108z, 118a, . . . , 118z if the initiator determines during service processing that additional work is required.

Work units are logical entities that represent a client request. The client request may cause multiple threads to run in different processes such as groups of database, transaction monitors or web processes. The multiple threads all represent one unit of work associated with the client request. Thus, in the present invention, by relating the multiple threads with one unit of work, the present invention is enabled to keep track of all resources a client request initiates. Additionally, such information becomes useful to monitor accounting information, transactional context and security flows.

Work Routers

As mentioned, routers 106a, ..., 106z receive work from a classifier 104. Each router 106a, ..., 106z is responsible for distributing one particular class of work. By the time work associated with a particular work request arrives at the routers 106a, ..., 106z, the classifier 104, having received a request for a service, has determined the class of work to be executed. Example of such-class of work may include database queries, web requests or transactional requests. The classifier 104 has also determined that the receiving router is the appropriate place to queue this request for execution.

The routers 106a, ..., 106z of the present invention allow multiple virtual machine processes to service incoming work. In addition, the routers 106a, ..., 106z need no be located on the same platform.

The routers 106a, ..., 106z in one embodiment of the present invention maintain several queues: 1) a ready work queue which includes a set of work that has been submitted to the router; 2) a registered initiators queue which includes a set of initiators that are registered with the router; 3) a dispatched work queue including work that has been dispatched to initiators and has not returned; 4) initiator work queues having a set of work that has been associated with an initiator and is ready to be executed; 5) executing initiator queues which includes a set of initiators that are currently in the process of executing work; 6) finished work queues including a set of work that has been completed but is awaiting post processing; 7) a statistics gathering queue having a set of completed work that is ready to have statistics extracted from it; and 8) a ready initiator queue having a set of initiator that are ready to have work dispatched to them. These associated router queues allow work at different phases of completion to flow through the distributed system of virtual machines without producing any bottleneck. Each queue is now fully described hereinbelow.

1) Ready Work

As the classifier 104 assigns work to the router 106a, ..., 106z, the classifier 104 queues the work in the router's ready work queue. The router 106a, ..., 106z tracks the size of this queue and reports it to the policy manager 110. If the size of this queue is growing then it is evident that there is not enough initiator capacity to process the volume of work arriving at the router 106a, ... 106z; or there is some other reason the router is unable to dispatch work quickly enough. This backlog is noted by the policy manager 110 and appropriate steps are taken to gather resources necessary to alleviate the load. One such remedial step may include the policy manager 110 starting an additional initiator at an available node 114, 116. Alternatively, the policy manager 110 may add additional router capacity.

Once a unit of work is dispatched by the router 106a, ... 106z to an initiator 108a, ..., 108z, 118a, ..., 118z, the time spent in the ready work queue and the time of dispatch are noted in the object associated with this work. When this manageable work object returns to the router 106a, ..., 106z, the time of return is also noted, thus providing the total time necessary to process this work request. These statistics become part of the accounting for the router 106a, ..., 106z as well as the initiator 108a, ..., 108z, 118a, ..., 118z responsible for the execution of that work. These statistics are then used to create additional initiator threads and/or processes on workstations with greater free capacity.

2) Register Initiators

After registering with a router 106a, ..., 106z for work, each available thread of the initiator 108a, ..., 108z, 118a, ..., 118z indicates to the router 106a, ..., 106z that they are ready to accept work. The initiator thread 108a, ..., 108z, 118a, ..., 118z is then queued at the router 106a, ..., 106z in an order determined by router queuing policy. This queue is referred to as a ready initiator queue. The router queuing policy implemented will be described in greater detail hereinbelow. At this point the initiator thread 108a, ..., 108z, 118a, ..., 118z waits for work to be queued for processing.

3) Dispatch Work to an Initiator

Each router 106a, ..., 106z optimizes its ready initiator queue so that the best choice for the next available initiator is near the start of the queue. When the router 106a, ..., 106z has work to be processed, the router 106a, ..., 106z packages this work and queues the packaged work at the best ready initiator.

4) Queue Work at Initiator

Upon receiving notification that new work is ready in its queue, the initiator thread 108a, ..., 108z, 118a, ..., 118z begins to process the incoming work. In one embodiment, the work is passed to the initiator 108a, ..., 108z, 118a, ..., 118z with the name of the local Java class to be executed along with arguments to pass to the executing object. This class exists in the classpath of the initiator and is instantiated by the initiator thread 108a, ..., 108z, 118a, ..., 118z. In one embodiment, the router 106a, ..., 106z may pass an object to be distributed, the object having a method or program to be executed, to the initiator thread 108a, ..., 108z, 118a, ..., 118z. The initiator thread 108a, ..., 108z, 118a, ..., 118z invokes the method or program using passed arguments if any.

5) Initiator Executes Unit of Work

Generally, results generated by the running object are handled by the object itself, along with any necessary communication. The object is capable of running anywhere the associated class of work is capable of executing. As a result, any affinity is implicit in the work classification. For example, if a service request is classified as printer work then it is clear that there is an affinity for ultimately executing on a printer.

6) Initiator Notifies Router when Finished

Initiators 108a, ..., 108z, 118a, ..., 118z contact the corresponding router 106a, ..., 106z when the current process the initiator 108a, ..., 108z, 118a, ..., 118z is handling completes. The manageable object is queued at the router for post processing. As part of this communication the initiator 108a, ..., 108z, 118a, ..., 118z communicates performance information about the initiator processes and the machine on which the initiator thread 108a, ..., 108z, 118a, ..., 118z is running. The collection of statistics may be specific to the operating system of the hardware. Alternatively, the statistics used may include time it takes for the work unit to complete. This makes the JWLM platform agnostic. Statistics concerning paging, CPU utilization or I/O, for instance, may also be incorporated.

Additionally, the initiator thread 108a, ..., 108z, 118a, ..., 118z informs the router that it has completed processing its assigned task. Generally, at this point the initiator 108a, ..., 108z, 118a, ..., 118z informs the router that it is also ready to receive another task from the router 106a, ..., 106z. It does so by queuing itself into the router's finished initiator queue and sends a signal to the router process informing it that a finished initiator is ready for processing.

In one embodiment, the initiator may indicate that it has finished the task in a separate step from informing the router that the initiator is ready for more work. This separation of the steps is useful when it is determined that a finished initiator is not ready to receive more work. For example, the initiator 108a, ..., 108z, 118a, ..., 118z may have received a signal from the policy manager 110 that the initiator 108a, ..., 108z, 118a, ..., 118z is scheduled for shutting down, or the initiator 108a, ..., 108z, 118a, ..., 118z may have some post processing to perform before being ready for more work. Alternatively, in another embodiment, and for improved performance, these two steps may be combined thus reducing the amount of communication and synchronization between the initiator 108a, ..., 108z, 118a, ..., 118z and router 106a, ..., 106z.

7) Router Completes Processing and Gathers Statistics

Finished manageable work objects returned by the initiator 108a, ..., 108z, 118a, ..., 118z are processed by the router 108a, ..., 108z, 118a, ..., 118z. The router 106a, ..., 106z processes the finished work by first noting the total response time from the dispatch to return receipt of the task. The total response time may be used to determine the performance of an initiator and to categorize the initiator performance.

The above described statistics relating to the work dispatched to the initiator 108a, ..., 108z, 118a, ..., 118z and other initiator performance are noted at the router 106a, ..., 106z. The initiator statistics are kept in an active aging table monitored by the router 106a, ..., 106z and also available to the policy manager 110. This table ages average response times from each initiator 108a, ..., 108z, 118a, ..., 118z as well as information specific to the router 106a, ..., 106z such as its average queue size over the same periods. This table is updated each time completed work is received from an initiator 108a, ..., 108z, 118a, ..., 118z at the router 106a, ..., 106z.

8) Initiator Sorted Back into Ready Queue

Ready initiators are queued at the router 106a, ..., 106z based on their past performance. The initiator 108a, ..., 108z, 118a, ..., 118z is queued in the router's ready queue such that the best performing initiators are given priority for receiving new tasks and thus will be near the beginning of the queue. Generally, any queuing algorithms known to skilled artisans in the field of computer data structures and algorithms may be employed for positioning the initiator in the ready queue.

The following are the initiator interfaces to the router which enable new types of work to be dynamically serviced by the cluster and also enable additional nodes to be able to join the system in executing work.

registerForWork( )—Causes an initiator to register with a router for the type of work provided by the router. The initiator reports to this router when requesting or finishing assigned work. Types of initiators are set by the business administrator. Types of initiators may include JVM's for database, payroll or warehouse work.

UnregisterForWork( )—Causes the initiator to no longer be associated with this router.

ReadyForWork( )—indicates that the initiator thread making this call is ready and waiting to process a work request from this router. Each thread of an initiator is treated separately as far as work assignment but accounting is done collectively for any one initiator and its threads.

FinishedWork( )—the initiator has finished processing a work request and is now indicating this to the router. The unit of work object which includes valuable information about the life of this request is passed back to the router.

Execution Components

Node Manager

In one embodiment of the present invention, each node 114, 116 capable of sharing in the processing of work runs at least one node manager 112, 120. The node manager 112, 120 is responsible for receiving and processing requests to start and stop the execution of initiators 108a, ..., 108z, 118a, ..., 118z at the respective node 114, 116. Each initiator 108a, ..., 108z, 118a, ..., 118z is started within its own Java Virtual Machine 126a, ..., 126z, 128a, ..., 128z separate from the node manager 114, 116. Initiators 108a, ..., 108z, 118a, ..., 118z are responsible for receiving work from a router 106a, ..., 106z to which it has registered. The node manager manages a node and dynamically adds and removes new virtual machines on the node for executing the work or portion of the work.

For the most flexibility, nodes 114, 116 have the capability of broadcasting their availability. This causes the global manager 122 to add them to the list of available nodes, enabling the policy manager 110 to cause nodes 114, 116 to have work scheduled for them by routers 106a, ..., 106z.

The policy manager 110 first indicates to the node manager 112, 120 a request to start initiators of the type currently needed in the system. The node manager 112, 120 starts the necessary initiators and the initiators 108a, ..., 108z, 118a, ..., 118z respond by registering with the specified router 106a, ..., 106z. This ability allows workstations to dynamically join a cluster for servicing work.

Methods in the interface for the Node Manager include the following. These methods facilitate the dynamic expansion and contraction of the node by enabling the creation of initiator which exist to execute a given work.

CreateInitiator( )—the node manager receives the name of the router to which the initiator reports and the type of work for which the initiator is responsible for executing.

DestroyInitiator( )—inform the node manager that it should shut down the initiator referenced in the call to the method.

Shutdown( )—inform the node manager that it should shut itself down after being certain that the initiators for which it is responsible have been destroyed.

Initiators

The present invention includes one or more initiators as shown at 108a, ..., 108z, 118a, ..., 118z. The functions of these initiators will now be described with reference to numeric identifier 108a. However, it should be understood that additional initiators (0.108z, 118a, ..., 118z) shown in FIG. 1 are also capable of performing the similar functions. Moreover, a reference to one router 106a shown in the Figure will be used in the following description. However, it should also be understood that the same description applies to other routers ( ..., 106z) in the present invention.

When instantiated, initiators 108a, ..., 108z, 118a, ..., 18a register with a router 106a, ..., 106z and indicate their readiness to accept work for processing. The initiator 108a waits for work from its router 106a and proceeds with processing upon receipt. The router 106a sends the name of the class of an object to be instantiated by the initiator 108a, any arguments to this object, and the unit of work to the initiator 108a. The initiator 108a instantiates an object of the appropriate type and waits for this work to complete. Upon completion, the unit of work with its packaging is sent back to the router 108a indicating that the work is complete. The packaging may include statistics from the initiator 108a regarding the performance of the work which the router 106a may track. At this point, the initiator 108a is ready for more work and may indicate such a state to the router 106a. The initiator 108a repeats this cycle of queuing itself for work and performing the work until an associated policy manager 110 directs it to do otherwise. The initiators 108a have the capacity to increase or decrease in quantity.

The methods of the initiator interface that enable work to be executed on the node having the initiators include the following.

NewWork( )—provides a new piece of work to the ready initiator along with a reference to the type and code to execute for this piece of work. Initiator is instructed to take note of JVM statistics and return them to the router upon notifying the router that this work has been completed.

AddInitiatorThread( )—instructs the initiator to add another initiator thread to the current set. This follows the normal routine of Ready->Execute->Finish.

RemoveInitiatorThread( )—instructs the initiator to stop the execution of one of its currently executing threads and remove the initiator thread from memory.

SuspendInitiatorThread( )—instructs the initiator to remove a thread from the current group of threads available for work but keep the thread ready for possible reactivation later.

WakeInitiatorThread( )—instructs the initiator to reactivate a sleeping thread and return it to service for processing work.

Figure 2:
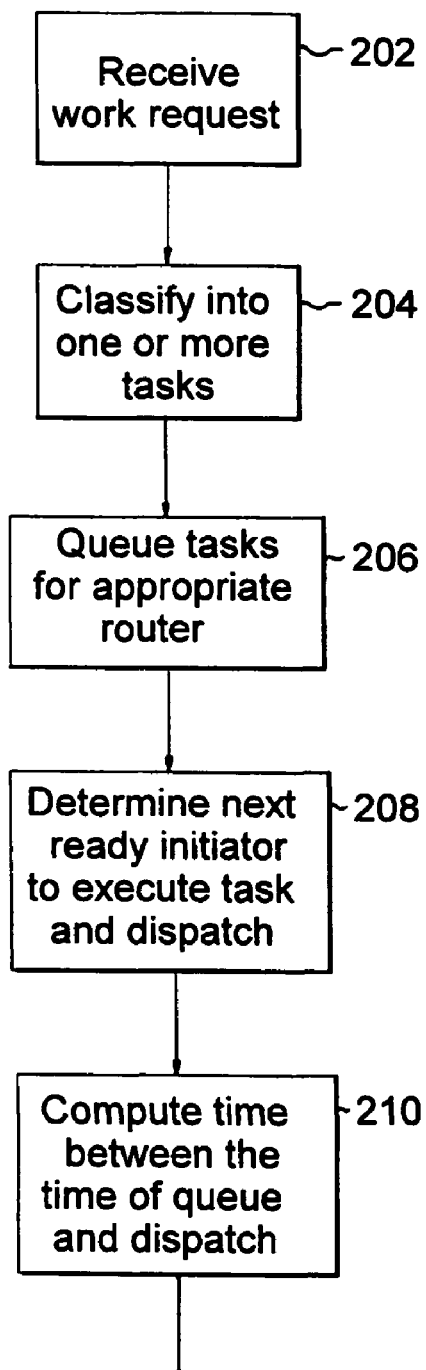
FIG. 2 is a flow diagram of the present invention in one embodiment.
Figure 2:
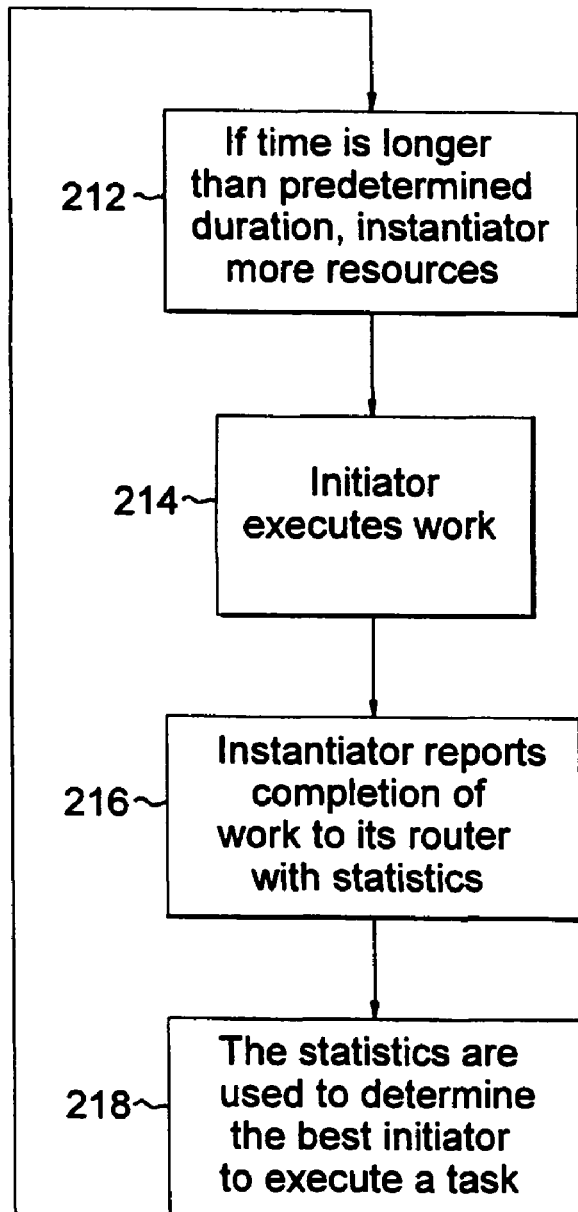

FIG. 2 is a flow diagram 200 of the present invention in one embodiment. At step 202, the classifier receives a work request. At step 204, the work request is classified into separate tasks such as database query, web processing, and print request. At step 206, each task is assigned into a queue of a router capable of handling the specific task. At step 208, the router determines next ready and available initiator for executing the task assigned in its queue. The router may determine the initiator by looking at its queue of ready initiators. These initiators may reside in different nodes in a cluster of workstations. The router than dispatches the work to the initiator.

At step 210, the time lapsed between the time when the work was queued and dispatched is computed and used by the policy manager to add or delete resources in the system as shown at step 212. At step 214, the initiator instantiates an object to execute the work. The object, although instantiated with a generic class name passed by the router, may have a different implementation specific to the node in which the initiator resides. Such a feature of the present invention enables utilizing system specific resources. At step 216, the initiator completes the work and reports to the router. The initiator at this time may queue itself as a ready and available initiator to execute a next task. Additionally, the initiator reports system specific information including hardware, operating system and performance statistics to the router. At 218, these statistics are used to determined the initiators best suited to handle a specific task most efficiently. The determined information is then used to dispatch subsequent tasks to the most appropriate initiators as determined.

Using Constants for Object Location Identity

In the present invention, there is no need for a configuration file that specifies special hardware/software features for the workstation running a distributed work. In one embodiment, the present invention may take advantage of such special features if they exist. If the feature does not exist, the present invention uses the implementation code running on the workstation. Moreover, the present invention enables the same copy of an application to be run on any platform/version/operating system. The present invention includes the logic of special features in the classpath that is dynamically compiled with the work unit at run time. The classpath is unique to the workstation and requires no additional set up of this workload distribution invention.

JWLM of the present may be implemented in Java and behave like a distributed Java Virtual Machine. However, it should be understood that the present invention may also be implemented utilizing other known programming languages and utilities.

While the invention has been particularly shown and described with respect to a preferred embodiment thereof, it will be understood by those skilled in the art that the foregoing and other changes in form and details may be made therein without departing from the spirit and scope of the invention.

Having this described our invention, what we claim as new, and desire to secure by Letters Patent is:

1. A method of distributing work through a cluster of workstations for efficient distributed processing, said cluster having a plurality of workstations interconnected over a network, the method comprising:

Receiving a work request at a first processing node;

Classifying, at said first processing node, the work request into one or more tasks;

Assigning said one or more tasks to one or more router queues associated with respective router devices at said first processing node, wherein a router device receives and distributes a specific task of a particular class of work in its associated router queue, each said router queue associated with a work task at a different phases of completion;

Dispatching said assigned one or more tasks by the router device for execution at a workstation at a second processing node having an execution module residing therein, the execution module at said second processing node comprising one or more initiators for instantiating one or more objects to execute the one or more work tasks, said initiators dynamically registering with the router device to indicate readiness to accept work for processing, said objects instantiated by one of the initiators with a generic class name passed to the initiator by said router device but having a different implementation specific to the second processing node in which said initiator resides to enable use of system specific resources and enable a single version of an application to run on each node; and, Upon completion of said one or more work tasks, each said one or more initiators providing to said respective router devices the completed work task at said first processing node and providing system specific statistic data associated with said initiator; and, Computing performance statistics of the one or more router queues and said one or more initiators, a performance statistic including a total response time from dispatch of the one or more work tasks from the router queue at said first processing node to an initiator at said second processing node, and the receipt of the completed work task at the router queue from that initiator at said second processing node, said total response time used to determine the performance of the one or more initiators and categorize the initiators performance for determining said one or more initiators best suited to execute said one or more tasks; and, Queuing ready initiators at a respective router device based on said categorized initiator performance, wherein said best performing ready initiators are given priority for receiving new tasks from respective router device.

2. The method of distributing work though a cluster of workstations as claimed in claim 1, wherein the step of dispatching includes:

determining one or more initiators at a second processing node best suited to execute said one or more tasks; and dispatching said one or more tasks to said best suited one or more initiators for execution.

* * * * *